United States Patent [19]

Badesha et al.

[11] Patent Number: 5,004,663

[45] Date of Patent: Apr. 2, 1991

[54] PHOTOCONDUCTIVE IMAGING MEMBERS WITH POLYPHOSPHAZENE BINDERS

[75] Inventors: Santokh S. Badesha, Pittsford; Milan Stolka; Damodar M. Pai, both of Fairport; Martin A. Abkowitz, Webster, all of N.Y.

[73] Assignee: Xerox Corporation, Stamford, Conn.

[21] Appl. No.: 386,322

[22] Filed: Jul. 28, 1989

[51] Int. Cl.$^5$ ............................................. G03G 5/047
[52] U.S. Cl. ............................................. 430/59; 430/64
[58] Field of Search ....................... 430/59, 78, 83, 64

[56] References Cited

U.S. PATENT DOCUMENTS

| | | |
|---|---|---|
| 3,370,020 | 2/1968 | Allcock et al. ........................ 260/2 |
| 3,515,688 | 6/1970 | Rose ........................................ 260/2 |
| 3,702,833 | 11/1972 | Rose et al. ........................... 260/2 P |
| 3,856,712 | 12/1974 | Reynard et al. .................... 260/2 P |
| 4,299,897 | 11/1981 | Stolka et al. .......................... 430/59 |
| 4,657,993 | 4/1989 | Lora et al. ............................ 525/538 |
| 4,882,254 | 11/1989 | Loutfy et al. .......................... 430/59 |

Primary Examiner—John Goodrow
Attorney, Agent, or Firm—E. O. Palazzo

[57] ABSTRACT

A photoconductive imaging member comprised of a photogenerating layer and a hole transport layer, including aryl amines dispersed in resin binders containing a polyphosphazene, such as poly[bis(p-tolylamino)]-polyphosphazene, poly[bis(naphthoxy)]polyphosphazene, or mixtures thereof.

38 Claims, 1 Drawing Sheet

PHOTOCONDUCTIVE IMAGING MEMBERS WITH POLYPHOSPHAZENE BINDERS

BACKGROUND OF THE INVENTION

This invention is generally directed to photoconductive imaging members, and more specifically to imaging members with polyphosphazene binders. The present invention in one embodiment is directed to layered imaging members comprised of charge transport layers with charge transport molecules dispersed in polyphosphazene binders. In a specific embodiment, the present invention relates to layered imaging members comprised of a photogenerating layer and a hole transport layer wherein the transport molecules thereof are dispersed in a polyphosphazene resinous binder. Further, in another embodiment of the present invention the imaging member is comprised of a supporting substrate, a photogenerating layer, and in contact therewith a charge, especially a hole transport layer comprised of hole transport molecules dispersed in a polyphosphazene resinous binder. The charge transport layer can be located as the top layer of the imaging member, or alternatively it may be situated between a supporting substrate and the photogenerating layer. The aforementioned polyphosphazene binders possess a number of advantages including, for example, the solubility thereof in a number of solvents such as aromatic solvents including toluene, tetrahydrofuran, xylene, and benzene, and aliphatic solvents such as halogenated hydrocarbons thus permitting, for example, improved coatability thereof with organic charge transport components utilizing various known processes such as spray, dip, and draw-down coating. Another advantage associated with many of the imaging members of the present invention resides in the ability to modify the substituents, or side groups present on the polyphosphazenes thereby providing, for example, substantial latitude in improving the mechanical and surface properties of the charge transport layers including, for example, environmental stability, abrasion resistence, elimination of a protective top coating, and/or excellent paper stripping characteristics for the imaging member. The imaging members of the present invention can be selected for a number of imaging and printing processes including electrophotographic imaging and printing processes for an extended number of imaging cycles, while substantially avoiding, or minimizing undesirable charge transport molecule crystallization. Also, the imaging members of the present invention can be selected for a number of color imaging and printing processes.

The formation and development of electrostatic latent images on the imaging surfaces of photoconductive materials by electrostatic means is well known. Numerous different photoconductive members for use in xerography are known such as selenium, alloys of selenium, layered imaging members comprised of aryl amine charge transport layers, reference U.S. Pat. No. 4,265,990, and imaging members with charge transport layers comprised of polysilylenes, reference U.S. Pat. No. 4,618,551. The disclosures of the aforementioned patents are totally incorporated herein by reference. With the aforementioned imaging members, especially those of the '990 patent, there are selected aryl amine charge transport layers, which aryl amines are soluble in halogenated hydrocarbons such as methylene chloride, and these hydrocarbons can be toxic, especially without fabrication precautions. The aforementioned disadvantage is avoided with the imaging members of the present invention in that the polyphosphazene selected as the charge transport resin binder is soluble in nontoxic solvents as illustrated herein, such as toluene, tetrahydrofuran and xylene. Further, the polyphosphazenes of the present invention can also be selected as resinous binders for imaging members with electron transport layers, reference U.S. Pat. No. 4,474,865, the disclosure of which is totally incorporated herein by reference.

In U.S. Pat. No. 4,869,988 and U.S. Pat. No. 4,946,754 entitled, respectively, PHOTOCONDUCTIVE IMAGING MEMBERS WITH N,N-BIS(BIARYLYL)ANILINE, OR TRIS(BIARYLYL)AMINE CHARGE TRANSPORTING COMPONENTS, and PHOTOCONDUCTIVE IMAGING MEMBERS WITH BIARYLYL DIARYLAMINE CHARGE TRANSPORTING COMPONENTS, the disclosures of which are totally incorporated herein by reference, there are described layered photoconductive imaging members with transport layers incorporating biarylyl diarylamines, N,N-bis(biarylyl)anilines, and tris(biarylyl)amines as charge transport compounds. In the above-mentioned patents, there are disclosed improved layered photoconductive imaging members comprised of a supporting substrate, a photogenerating layer optionally dispersed in an inactive resinous binder, and in contact therewith a charge transport layer comprised of the above-mentioned charge transport compounds, or mixtures thereof dispersed in resinous binders.

Examples of specific hole transporting components disclosed in U.S. Pat. No. 4,869,988 include N,N-bis(4-biphenylyl)-3,5-dimethoxyaniline (Ia); N,N-bis(4-biphenylyl)-3,5-dimethylaniline (Ib); N,N-bis(4-methyl-4'-biphenylyl)-3-methoxyaniline (Ic); N,N-bis(4-methyl-4'-biphenylyl)-3-chloroaniline (Id); N,N-bis(4-methyl-4'-biphenylyl)-4-ethylaniline (Ie); N,N-bis(4-chloro-4'-biphenylyl)-3-methylaniline (If); N,N-bis(4-bromo-4'-biphenylyl)-3,5-dimethoxy aniline (Ig); 4-biphenylyl bis(4-ethoxycarbonyl-4'-biphenylyl)amine (IIa); 4-biphenylyl bis(4-acetoxymethyl-4'-biphenylyl)amine (IIb); 3-biphenylyl bis(4-methyl-4'-biphenylyl)amine (IIc); 4-ethoxycarbonyl-4'-biphenylyl bis(4-methyl-4'-biphenylyl)amine (IId); and the like.

Examples of specific hole transporting compounds disclosed in U.S. Pat. No. 4,946,754 include bis(p-tolyl)-4-biphenylylamine (IIa); bis(p-chlorophenyl)-4-biphenylylamine (IIb); N-phenyl-N-(4-biphenylyl)-p-toluidine (IIc); N-(4-biphenylyl)-N-(p-chlorophenyl)-p-toluidine (IId); N-phenyl-N-(4-biphenylyl)-p-anisidine (IIe); bis(m-anisyl)-4-biphenylylamine (IIIa); bis(m-tolyl)-4-biphenylylamine (IIIb); bis(m-chlorophenyl)-4-biphenylylamine (IIIc); N-phenyl-N-(4-biphenylyl)-m-toluidine (IIId); N-phenyl-N-(4-bromo-4'-biphenylyl)-m-toluidine (IVa); diphenyl-4-methyl-4'-biphenylylamine (IVb); N-phenyl-N-(4-ethoxycarbonyl-4'-biphenylyl)-m-toluidine (IVc); N-phenyl-N-(4-methoxy-4'-biphenylyl)-m-toluidine (IVd); N-(m-anisyl)-N-(4-biphenylyl)-p-toluidine (IVe); bis(m-anisyl)-3-biphenylylamine (Va); N-phenyl-N-(4-methyl-3'-biphenylyl)-p-toluidine (Vb); N-phenyl-N-(4-methyl-3'-biphenylyl)-m-anisidine (Vc); bis(m-anisyl)-3-biphenylylamine (Vd); bis(p-tolyl)-4-methyl-3'-biphenylylamine (Ve); N-p-tolyl-N-(4-methoxy-3'-biphenylyl)-m-chloroaniline (Vf), and the like.

It is also indicated in the aforementioned two copending applications that there may be selected as resin binders for the charge transport molecules those components as illustrated in U.S. Pat. No. 3,121,006 including polycarbonates, polyesters, epoxy resins, polyvinylcarbazole; and also wherein for the preparation of the charge transport layer with a polycarbonate there is selected methylene chloride as a solvent.

In a patentability search report there were recited the following U.S. Pat. No. 4,657,993, the disclosure of which is totally incorporated herein by reference, directed to polyphosphazene homopolymers and copolymers of the formula as recited, for example, in the Abstract of the Disclosure, which components may be selected as photoconductive materials and for other uses, see column 1, and continuing on to column 2; and as background interest U.S. Pat. No. 3,370,020 directed to processes for the preparation of phosphonitrilic polymer mixtures, reference the Abstract of the Disclosure, U.S. Pat. No. 3,515,688 related to phosphonitrile elastomers, reference for example the Abstract of the Disclosure; U.S. Pat. No. 3,702,833 directed to curable fluorophosphazene polymers, see for example column 1; and U.S. Pat. No. 3,856,712 directed to polyphosphazene copolymers which are elastomers. The disclosures of each of the aforementioned patents are totally incorporated herein by reference. The polyphosphazenes of the '993 patent and other polyphosphazenes illustrated hereinafter are particularly useful as resinous binders for the invention of the present application.

While imaging members with various charge transporting substances, especially hole transports, including the aryl amines disclosed in the prior art, are suitable for their intended purposes, there continues to be a need for improved imaging members, particularly layered members, with resin binders that are soluble in a number of solvents. Another need resides in the provision of layered imaging members that are compatible with liquid developer compositions. Further, there continues to be a need for layered imaging members wherein the layers are sufficiently adhered to one another to allow the continuous use of such members in repetitive imaging systems. Also, there continues to be a need for improved layered imaging members comprised of hole transport layers wherein the problems of transport molecule crystallization, bleeding and leaching are avoided or minimized. Furthermore, there is a need for imaging members with charge transport compounds or polymers dispersed in polyphosphazene resin binders that are soluble in nontoxic solvents, and wherein the resulting image members are inert to the users thereof. A further need resides in the provision of photoconductive imaging members with desirable mechanical characteristics.

SUMMARY OF THE INVENTION

It is therefore an object of the present invention to provide layered photoresponsive imaging members with many of the advantages indicated herein.

Also, it is an object of the present invention to provide binders for charge transport molecules contained in layered photoconductive imaging members.

It is yet another object of the present invention to provide layered photoresponsive imaging members with charge especially hole transport layers in contact with a photogenerating layer, which members are suitable for use with liquid and dry developers.

In a further object of the present invention there is provided a layered photoresponsive imaging member with a photogenerating layer situated between a supporting substrate, and a hole transport layer with a polyphosphazene resin binder.

In yet another object of the present invention there is provided a photoresponsive imaging member comprised of a hole transporting layer situated between a supporting substrate and a photogenerating layer.

In another object of the present invention there are provided imaging and printing methods with the layered imaging members disclosed herein.

Another object of the present invention resides in the provision of hole or electron transport layers which can be prepared with nontoxic polyphosphazene resin binders.

A further object of the present invention is to provide improved layered imaging members wherein the problems of transport molecule crystallization, hole charge transport molecule, bleeding and leaching, and the like are eliminated or minimized enabling their selection, for example, in imaging apparatuses with liquid developer compositions and which members are insensitive to changes in environmental conditions.

Further, in another specific object of the present invention there are provided imaging members with charge, especially hole, transport layers that can be fabricated from solvents other than halogeneted materials such as methylene chloride.

Also, in another specific object of the present invention there are provided imaging members with charge transport layers that are free or substantially free of charge trapping.

Another specific object of the present invention resides in the provision of imaging members with electrical stability for an extended number of imaging cycles, for example exceeding 100,000 in some instances.

Moreover, in another object of the present invention there are provided charge transport layers for imaging members, which layers can be prepared with nontoxic solvents.

Furthermore, in another object of the present invention there are provided polyphosphazene resin binders for hole transporting molecules or for electron transporting molecules.

These and other objects of the present invention are accomplished by the provision of layered imaging members comprised, for example, of a photogenerating layer and a charge transport layer. More specifically, the present invention is directed to layered imaging members comprised of photogenerating layers, and in contact therewith hole or electron charge transport layers comprised of, for example, hole transporting aryl amines, the amines of U.S. Pat. No. 4,299,897, the disclosure of which is totally incorporated herein by reference, and the like dispersed in a polyphosphazene resin binder.

In one specific embodiment, the present invention is directed to a layered photoconductive imaging member comprised of a supporting substrate, a photogenerating layer comprised of organic or inorganic photoconductive pigments optionally dispersed in an inactive resinous binder, and in contact therewith a hole transport layer comprised of the aryl amines as illustrated in U.S. Pat. No. 4,265,990, the disclosure of which is totally incorporated herein by reference, and the aforementioned '897 patent, which amines are dispersed in a polyphosphazene resin binder.

Examples of specific hole transporting molecules in addition to the aryl amines disclosed herein include, but are not limited to, those molecules of the following formulas wherein X is independently selected from halogen or alkyl, and preferably N,N'-diphenyl-N,N'-bis(3-methylphenyl)-(1,1'-biphenyl)-4,4'-diamine.

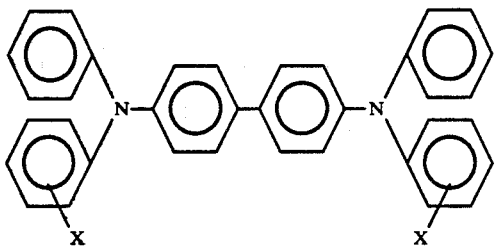

Various known polyphosphazenes present in effective amounts can be selected as the resinous binder for the charge, especially hole transporting molecules or electron transporting molecules including those polyphosphazenes of the formula

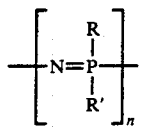

wherein R and R' are independently selected from alkyl, aryl, alkyl amino, aryl amino, alkoxy, aryloxy, and the like; and n represents the number of repeating segments and is generally, for example, from 1 to about 100 and preferably from 1 to about 25. Alkyl and alkoxy includes those substituents with from 1 to about 25 carbon atoms such as methyl, ethyl, propyl, butyl, hexyl, octyl, nonyl, methoxy, ethoxy, propoxy, butoxy, pentoxy, and the like, while aryl includes substituents with from 6 to about 25 carbon atoms such as phenyl, naphthyl, and the like.

Specific examples of polyphosphazenes, preferably present, for example, in an amount of from about 40 to about 70 weight percent, and more preferably from about 45 to about 55 weight percent, although other effective amounts may be selected, include poly[bis(p-tolylamino)]phosphazene, poly[bis(alkoxy)]phosphazene, poly[bis(aryloxy)]phosphazene, poly[bis(methoxy)]phosphazene, poly[bis(ethoxy)]phosphazene, poly[bis(propyloxy)]phosphazene, poly[bis(trifluoroethoxy)]phosphazene, poly[bis(2-naphthoxy)]phosphazene, poly[bis(p-tolyloxy)]phosphazene, poly[bis(phenoxy)]phosphazene, poly[bis(p-bromophenoxy)]phosphazene, poly[bis(p-chlorophenoxy)]phosphazene, poly[bis(arylamino)]phosphazene, poly[bis(alkylamino)]phosphazene, poly[bis(methylamino)]phosphazene, poly[bis(ethylamino)]phosphazene, poly[bis(p-tolylamino)]phosphazene, poly[bis(p-anilino)]phosphazene, poly[bis(2-naphthylamino)]phosphazene, poly[bis(p-xylylamino)]phosphazene, poly[bis(dialkylamino)]phosphazene, poly[bis(diarylamino)]phosphazene, poly[bis(dimethylamino)]phosphazene, poly[bis(diethylamino)]phosphazene, poly[bis(dipropylamino)]phosphazene, poly[bis(dibutylamino)]phosphazene, poly[bis(p-ditolylamino)]phosphazene, poly[bis(carbazolyl)]phosphazene, poly[bis(dialkyl)]phosphazene, poly[bis(diaryl)]phosphazene, poly[bis(dimethyl)]phosphazene, poly[bis(diethyl)]phosphazene, poly[bis(dibenzyl)]phosphazene, poly[bis(ditoyl)]phosphazene, and poly[bis(dixylyl)]phosphazene.

Solvent examples that can be selected for the preparation of the charge transport layer with the polyphosphazene resinous binder include, for example, in an amount of from about 5 volume to about 95 volume percent aromatic solvents such as toluene, xylene, benzene; etherial solvents such as tetrahydrofuran, 1,4-dioxane; and the like.

The photoresponsive imaging members of the present invention can be prepared by a number of known methods, the process parameters and the order of the coating of the layers being dependent on the member desired. Thus, for example, the photoresponsive members of the present invention can be prepared by providing a conductive substrate with an optional charge blocking layer and an optional adhesive layer, and applying thereto a photogenerating layer, and overcoating thereon a charge transport layer from a nontoxic solvent solution containing charge transporting molecules dispersed in a polyphosphazene resinous binder. The photoresponsive imaging members of the present invention can be fabricated by common known coating techniques such as by dip coating, draw-bar coating, or by spray coating process, depending mainly on the type of imaging devices desired. Each coating, however, can be usually dried, for example, in a convection or forced air oven at a suitable temperature before a subsequent layer is applied thereto. In one embodiment of the present invention, the transport layer can be fabricated from a 10 weight percent solution of the charge transporting or electron transporting molecules, which molecules are usually present in an amount of from about 35 to about 60 weight percent, and preferably 40 weight percent, and are dispersed in a polyphosphazene resinous binder, preferably in an amount of 60 weight percent, with a preferred polyphosphazene being poly[bis(p-tolylamine)]phosphazene or poly[bis(2-naphthoxy)]phosphazene. The aforementioned solution can be obtained by stirring 6 grams of the selected polyphosphazene and 4 grams of the charge transport or electron transporting molecule in 100 milliliters of toluene at ambient temperature. The resulting solution can then be draw bar coated on the photogenerating layer and thereafter dried. The drying temperature is dependent on a number of factors including the components selected, particularly the photogenerating component, but generally drying is accomplished at about 130° C., especially in situations wherein trigonal selenium is selected as the photogenerating pigment dispersed in a polyvinyl carbazole binder, or wherein vacuum deposited arsenic selenium alloys are selected.

DETAILED DESCRIPTION OF THE INVENTION

Figure 1:
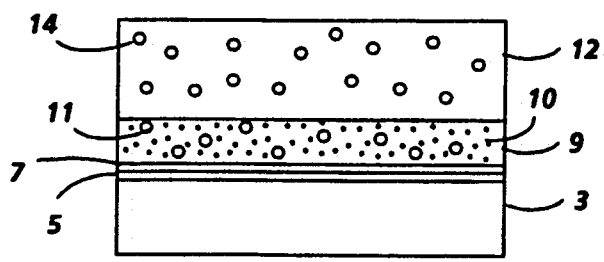
FIG. 1 represents a partially schematic cross-sectional view of a photoresponsive imaging member of the present invention.

Illustrated in FIG. 1 is a photoresponsive imaging member of the present invention comprising a supporting substrate 3 of a thickness of from about 50 microns to about 5,000 microns, a charge carrier photogenerating layer 5 of a thickness of from about 0.5 micron to about 5 microns comprised of a photogenerating pigment 6 optionally dispersed in a resinous binder composition 7, and a hole transport layer 9 of a thickness of from about 10 microns to about 60 microns comprised of an aryl amine dispersed in a polyphosphazene resin binder 8.

Figure 2:
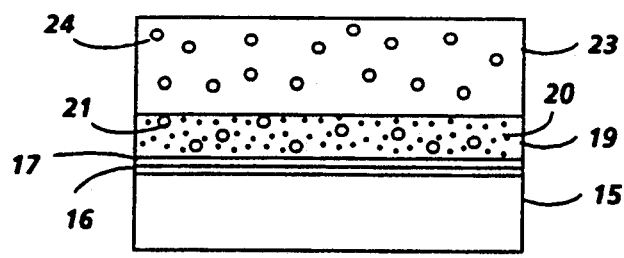
FIGS. 2 and 3 represent partially schematic cross-sectional views of preferred photoresponsive imaging members of the present invention.

Illustrated in FIG. 2 is a photoresponsive imaging member of the present invention comprised of about a 25 micron to about a 100 micron thick conductive supporting substrate 15 of aluminized Mylar, a 0.5 micron to about a 5 micron thick photogenerating layer 17 comprised of trigonal selenium photogenerating pigments 19 dispersed in a resinous binder 21 in the amount of 10 percent to about 80 percent by weight, and a 10 micron to about a 60 micron thick hole transport layer 23 comprised of the aryl amine charge transport N,N'-diphenyl-N,N'-bis(3-methylphenyl)1,1'-biphenyl-4,4'-diamine dispersed in the resin binder poly[bis(p-tolylamino)]phosphazene 24.

Figure 3:
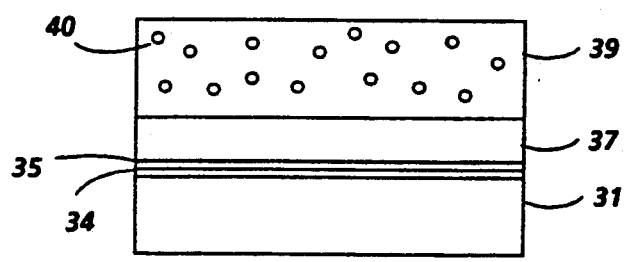

Another photoresponsive imaging member of the present invention, reference FIG. 3, is comprised of a conductive supporting substrate 31 of aluminum of a thickness of 50 microns to about 5,000 microns, a photogenerating layer 33 comprised of amorphous selenium or an amorphous selenium alloy, especially selenium arsenic (99.5/0.5) and selenium tellurium (75/25), of a thickness of 0.1 micron to about 5 microns, and a 10 micron to about 60 micron thick hole transport layer 37 comprised of the aryl amine hole transport N,N'-diphenyl-N,N'-bis(3-methylphenyl)1,1'-biphenyl-4,4'-diamine, 55 weight percent, dispersed in the resin binder poly[bis(naphoxy)]phosphazene 39.

Figure 4:
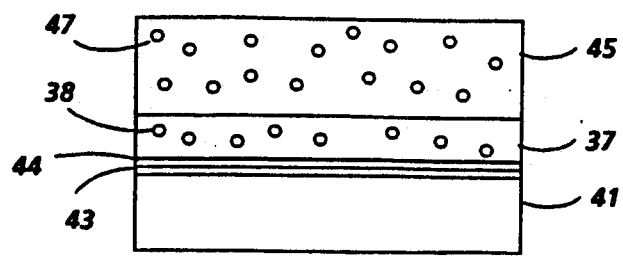
FIG. 4 represents a partially schematic cross-sectional view of a photoresponsive imaging member of the present invention wherein the charge transporting layer is situated between a supporting substrate, and the photogenerating layer.

Illustrated in FIG. 4 is another photoresponsive imaging member of the present invention comprised of a 25 micron to 100 microns thick conductive supporting substrate 41 of aluminized Mylar, a 10 micron to about 70 micron thick hole transport layer 47 comprised of N,N'-diphenyl-N,N'-bis(3-methylphenyl)1,1'-biphenyl-4,4'-diamine hole transport molecules, 55 weight percent, 48 dispersed in the resin binder poly[bis(p-tolylamino)]phosphazene, and a 0.1 micron to about 5 micron thick photogenerating layer 50 comprised of vanadyl phthalocyanine photogenerating pigments 53 optionally dispersed in a polyester resinous binder 55 in an amount of about 10 percent to about 80 percent by weight.

The polyphosphazenes selected as resin binders for the imaging members of the present invention are known, reference for example the U.S. patents recited in the patentability search mentioned herein, including particularly U.S. Pat. No. 4,657,993, the disclosure of which is totally incorporated herein by reference; inorganic macromolecules, *Chemical and Engineering News*, Mar. 18, 1985, page 22, the disclosure of this article being totally incorporated herein by reference; and the text by H. R. Allcock, *Phosphorous-Nitrogen Compounds*, Academic Press, New York, 1972, the disclosure of which is totally incorporated herein by reference. Additionally, some of the polyphosphazenes such as those prepared in working Examples I and II, referred to hereinafter, are available, for example, from Shin Nisso Kako Company, Ltd. of Japan. Usually the aforementioned polyphosphazenes can be purified when appropriate to remove undesirable impurities such as chlorine. Purification can be accomplished by known methods, including repeating the process of dissolving the polyphosphazenes in toluene or tetrahydrofuran, followed by precipitation from hot methanol and hexane, for example.

The supporting substrate layers may be opaque or substantially transparent and may comprise any suitable material possessing, for example, the requisite mechanical properties. The substrate may comprise a layer of an organic or inorganic material having a conductive surface layer arranged thereon or a conductive material such as, for example, aluminum, chromium, nickel, indium, tin oxide, brass or the like. The substrate may be flexible or rigid and can be comprised of various different configurations such as, for example, a plate, a cylindrical drum, a scroll, and the like. The thickness of the substrate layer is dependent on many factors including, for example, the components of the other layers, and the like; generally, however, the substrate is of a thickness of from about 50 microns to about 5,000 microns.

Examples of preferred photogenerating layers, especially since they permit imaging members with a photoresponse of from about 400 to about 700 nanometers, for example, include those comprised of known photoconductive charge carrier generating materials, such as amorphous selenium alloys, halogen doped amorphous selenium, halogen doped amorphous selenium alloys, and doped trigonal selenium, copper, and chlorine doped cadmium sulfide, cadmium selenide and cadmium sulfur selenide, and the like, reference U.S. Pat. Nos. 4,232,102 and 4,233,283, the disclosures of each of these patents being totally incorporated herein by reference. Examples of specific alloys include selenium arsenic with from about 95 to about 99.8 weight percent selenium; selenium tellurium with from about 70 to about 90 weight percent of selenium; the aforementioned alloys containing dopants such as halogens including chlorine in amounts of from about 100 to about 1,000 parts per million; ternary alloys, and the like. The thickness of this photogenerating layer is dependent on a number of factors, such as the materials included in the other layers, and the like; generally, however, this layer is of a thickness of from about 0.1 micron to about 5 microns, and preferably from about 0.2 microns to about 2 microns, depending on the photoconductive volume loading, which may vary from about 5 percent to about 100 percent by weight. Generally, it is desirable to provide this layer in a thickness which is sufficient to absorb about 90 percent or more of the incident radiation which is directed upon it in the imagewise exposure step. The maximum thickness of this layer is dependent primarily upon factors such as mechanical considerations, for example, whether a flexible photoresponsive device is desired. Also, there may be selected as photogenerators organic components such as squaraines, perylenes, reference for example U.S. Pat. No. 4,587,189, the disclosure of which is totally incorporated herein by reference, metal phthalocyanines, metal free phthalocyanines, vanadyl phthalocyanine, dibromoanthanthrone, and the like.

The hole transport layer can be comprised of one or a mixture thereof in some embodiments of the transport molecules illustrated herein, and preferably the aryl amines of the formula illustrated herein. The thickness of the transport layer is, for example, from about 5 microns to about 50 microns with the thickness depending predominantly on the nature of intended applications. In addition, a layer of adhesive material located, for example, between the substrate and the photogenerating layer to promote adhesion thereof can be utilized. This layer may be comprised of known adhesive materials such as polyester resins, reference 49,000 polyester available from Goodyear Chemical Company, polysiloxane, arylic polymers, and the like. A thickness of from about 0.001 micron to about 0.1 micron is generally employed for the adhesive layer. Hole blocking layers usually situated between the substrate and the photogenerating layer, and preferably in contact with the supporting substrate include, for example, those derived from the polycondensation of aminopropyl trialkoxysilane or aminobutyl trialkoxysilane, such as 3-aminopropyltrimethoxysilane, 3-aminopropyltriethoxysilane, or 4-aminobutyltrimethoxysilane thereby improving in some embodiments the dark decay characteristics of the imaging member. Typically, this layer has a thickness of from about 0.001 micron to about 5 microns or more in thickness, depending on the desired effectiveness for preventing or minimizing the dark injection of charge carriers into the photogenerating layer.

With the layered imaging members of the present invention, wherein the photogenerating layer is comprised of amorphous selenium, this member when charged to a negative voltage of 400 volts with a corotron had a photosensitivity of 5 ergs per square centimeter. The residual voltage buildup for this imaging member was negligible (about less than one volt) after 1,000 imaging cycles in a xerographic imaging test fixture. The overall electrical performance (photosensitivity, cyclic stability, and dark decay) was superior to a similar imaging member fabricated with a polycarbonate (Lexan), 45 weight percent, as resin binder for the charge transport molecule.

Examples of electron transporting components that may be selected for the imaging members of the present invention are illustrated, for example, in U.S. Pat. No. 4,474,865, the disclosure of which is totally incorporated herein by reference.

The following examples are being supplied to further define specific embodiments of the present invention, it being noted that these examples are intended to illustrate and not limit the scope of the present invention. Also, parts and percentages are by weight unless otherwise indicated.

EXAMPLE I

Preparation of Poly[Bis(p-tolylamino)]Phosphazene

Thirty (30) grams of hexachlorophosphazene obtained from Aldrich Chemical Company was evacuated in a clean dry glass tube to a pressure of $10^{-4}$ Torr and sealed off. The tube and contents were then heated for 30 hours. After cooling and opening the tube, excess hexachlorophosphazene (8 grams) was removed by vacuum sublimation. There results the soluble polymer poly(dichloro)phosphazene, which polymer was then dissolved in 300 milliliters of dry toluene.

To the above solution, there was added a solution of 10 grams of p-toluidine in 50 milliliters of dry toluene, and the resulting solution was refluxed under argon atmosphere for 16 hours. The contents of the flask were then reduced to approximately 150 milliliters by distilling off toluene. The resulting reaction mixture was then poured dropwise into water. The precipitates obtained were separated by filtration followed by dissolution in toluene. This toluene solution was then added dropwise into 500 milliliters of refluxing methanol. The resulting precipitate was again dissolved in toluene and the polymer, which was poly[bis(p-tolylamino)]phosphazene, was reprecipitated by the dropwise addition of the aforementioned polymer solution to boiling methanol. This process of dissolution and reprecipitation was repeated two more times to ensure the removal of electronically active impurities. The above resulting clear poly bis phosphazene polymer was then characterized by conventional analytical methods which included IR, NMR, UV and elemental analysis.

EXAMPLE II

Preparation of Poly[Bis(2-naphthoxy)]Phosphazene

Twenty-five (25) grams of hexachlorophosphazene obtained from Aldrich Chemical Company were evacuated in a clean dry glass tube to a pressure of $10^{-4}$ Torr and sealed off. The tube and contents were then heated for 24 hours. After cooling and opening the tube, excess hexachlorophosphazene (6 grams) was removed by vacuum sublimation. There resulted the soluble polymer poly(dichloro)phosphazene, which polymer was then dissolved in 300 milliliters of dry toluene.

In a separate flask, 10 grams of 2-naphthol in 100 milliliters of 1,4-dioxane were added to 3 grams of sodium hydroxide (80 percent dispersion in oil). The reaction was exothermic and the contents of the flask were stirred and refluxed under an argon atmosphere for 30 minutes. The solution of poly(dichloro)phosphazene in toluene prepared above was then added dropwise to the dioxane solution over a 1 hour period. During this time, the argon was continuously bubbled through the reaction flask. The contents of the flask were further stirred and refluxed for 20 hours. After cooling to room temperature, the contents of the flask were filtered. The resulting precipitate, which it is believed was comprised of sodium salts, was discarded and the filtrate was concentrated on a Rotary Evaporator to approximately 125 milliliters. This filtrate was then dropwise added to 500 milliliters of distilled water. The white sticky mass obtained was redissolved in toluene and poured dropwise into 500 milliliters of methanol. The white precipitate obtained was separated by filtration. This process of dissolution in toluene and reprecipitation in methanol was repeated three times. The resulting white fluffy polymer was collected and identified by NMR, IR, UV and elemental analysis to be poly[bis(2-naphthoxy)]phosphazene.

EXAMPLE III

A photoresponsive imaging member was prepared by providing an aluminized Mylar substrate in a thickness of 75 microns, followed by applying thereto with a multiple-clearance film applicator a solution of N-methyl-3-aminopropyl-trimethoxysilane (obtained from PCR Research Chemicals) in ethanol (1:20 volume ratio). This hole blocking layer, 0.1 micron, was dried for 5 minutes at room temperature, and then cured for 10 minutes at 110° C. in a forced air oven. There was then applied to the above silane layer a solution of 0.5 percent by weight of 49,000 polyester (obtained from E. I. DuPont Chemical) in a mixture of methylene chloride and 1,1,2-trichloroethane (4:1 volume ratio) with a multiple-clearance film applicator. The layer was allowed to dry for one minute at room temperature, and 10 minutes at 100° C. in a forced air oven. The resulting adhesive layer had a dry thickness of 0.05 micron.

A dispersion of trigonal selenium and poly(N-vinycarbazole) was prepared by ball milling 1.6 grams of trigonal selenium and 1.6 grams of poly(N-vinylcarbazole) in 14 milliliters each of tetrahydrofuran and toluene. A 1.0 micron thick photogenerator layer was then fabricated by coating the above dispersion onto the above adhesive layer present on the Mylar substrate with a multiple-clearance film applicator, followed by drying in a forced air oven at 135° C. for 5 minutes.

A solution of 4.0 grams of the aryl amine N,N'-diphenyl-N,N'-bis(3-methylphenyl)1,1'-biphenyl-4,4'-diamine and 6 grams of poly[bis(p-tolylamino)]phosphazene resin binder in 100 milliliters of toluene was then coated over the photogenerator layer by means of a multiple-clearance film applicator. The resulting member was subsequently dried in a forced air oven at 130° C. for 30 minutes resulting in a 22 micron thick hole transport layer with 60 weight percent of the poly[bis(p-tolylamino)]phosphazene resin binder.

The above fabricated imaging member was electrically tested by negatively charging it with a corona, and discharged by exposing it to white light of wavelengths of from 400 to 700 nanometers. Charging was accomplished with a single wire corotron in which the wire was contained in a grounded aluminum channel and was strung between two insulating blocks. The acceptance potential of this imaging member after charging, and its residual potential after exposure were recorded. The procedure was repeated for different exposure energies supplied by a 75 watt Xenon arc lamp of incident radiation, and the exposure energy required to discharge the surface potential of the member to half of its original value was determined. This surface potential was measured using a wire loop probe contained in a shielded cylinder, and placed directly above the photoreceptor member surface. This loop was capacitively coupled to the photoreceptor surface so that the voltage of the wire loop is calibrated to correspond to the surface potential. Also, the cylinder enclosing the wire loop was connected to the ground.

The above imaging member was negatively charged to a surface potential of 400 volts, and discharged to a residual potential of 15 volts. The dark decay of this device was about 10 volts/0.5 second. Further, the electrical properties of the above prepared photoresponsive imaging member remained essentially unchanged for 10,000 cycles of repeated charging and discharging.

EXAMPLE IV

A layered photoresponsive imaging member was fabricated by repeating the procedure of Example III with the exceptions that a 0.5 micron thick layer of amorphous selenium photogenerating components on a ball grained aluminum plate of a thickness of 7 mils (175 microns) was utilized, and wherein conventional vacuum deposition techniques were selected. Vacuum deposition of the selenium photogenerating layer was accomplished at a vacuum of $10^{-6}$ Torr, while the substrate was maintained at about 50° C. Thereafter, the resulting imaging device was dried in a forced air oven at 40° C. for 1 hour to form a 20 micron thick hole transport layer. Subsequently, the imaging member was cooled to room temperature, followed by electrical testing by repeating the procedure of Example III with the exception that a 450 nanometer monochromatic light was selected for irradiation. This imaging member was negatively charged to 850 volts and discharged to a residual potential of 30 volts. The dark decay of this device was 5 volts/second.

EXAMPLE V

A layered photoresponsive imaging member was prepared by repeating the procedure of Example IV by depositing a 0.5 micron thick layer of amorphous selenium on a ball grained aluminum plate of a thickness of 7 mils with the exception that poly[bis(2-naphthoxy)]phosphazene was selected in place of the polyphosphazene of Example III. Thereafter, the resulting device or imaging member was dried in a forced air oven at 40° C. for 1 hour to form a 25 micron thick hole transport layer. Subsequently, the imaging member was cooled to room temperature, followed by electrical testing by repeating the procedure of Example III with the exception that a 450 nanometer monochromatic light was selected for irradiation. Specifically, this imaging member was negatively charged to 800 volts and discharged to a residual potential of 90 volts. The electrical performance of this imaging member remained essentially the same after 1,000 cycles of repeated charging and discharging.

EXAMPLE VI

A photoresponsive imaging member was prepared by repeating the procedure of Example III with the exception that poly[bis(2-naphthoxy)]phosphazene was selected in place of the polyphosphazene of Example III. Electrical testing of the resulting layered imaging member was accomplished by repeating the procedure of Example III. Specifically, the above prepared imaging member was charged negatively to 950 volts and discharged to a residual potential of 70 volts. For this imaging device, the dark decay was less than 50 volts/second. The electrical characteristics of this member remained essentially unchanged for 1,000 cycles of repeated charging, and discharging.

It is believed that images with excellent resolution with substantially no background deposits can be obtained subsequent to development with known toner compositions comprised, for example, of styrene n-butyl methacrylate copolymer resin, 88 weight percent, 10 weight percent of carbon black, and 2 weight percent of the charge additive distearyl dimethyl ammonium methyl sulfate, reference U.S. Pat. No. 4,560,635, the disclosure of which is totally incorporated herein by reference.

Specific advantages of the present invention, some of which have been mentioned herein, include the solubility of the polyphosphazenes in a number of different solvents, especially solvents other then halogenated hydrocarbons; excellent adhesion characteristics, particularly between the charge transport or electron transport layer and the photogenerating layer; thermal and electrical imaging member stability; and photoconductive members that enable images in many instances with substantially no background deposits and images of excellent resolution subsequent to development.

Although the invention has been described with reference to specific preferred embodiments, it is not intended to be limited thereto, rather those skilled in the art will recognize variations and modifications may be made therein which are within the spirit of the invention and within the scope of the following claims.

What is claimed is:

1. A photoconductive imaging member comprised of a photogenerating layer, and a hole transport layer containing a polyphosphazene resinous binder.

2. A photoconductive imaging member in accordance with claim 1 wherein the transport layer contains hole transport molecules.

3. A photoconductive imaging member in accordance with claim 2 wherein the hole transport molecules are comprised of aryl amines of the formula

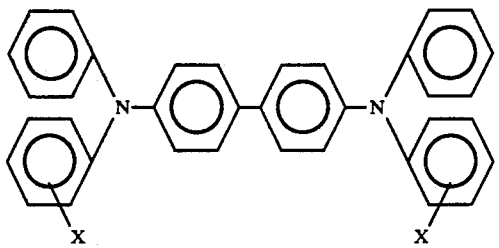

wherein X is independently selected from the group consisting of alkyl and halogen.

4. A photoconductive imaging member in accordance with claim 2 wherein the hole transport molecules are comprised of the aryl amine N,N'-diphenyl-N,N'-bis(3-methyl phenyl)-(1,1'-biphenyl)-4,4'-diamine.

5. An imaging member in accordance with claim 1 wherein the polyphosphazene resinous binder is of the formula

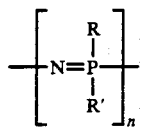

wherein R and R' are independently selected from the group consisting of alkyl, aryl, alkyl amino, aryl amino, alkoxy, and aryloxy; and n represents the number of repeating segments.

6. An imaging member in accordance with claim 5 wherein alkyl contains from 1 to about 25 carbon atoms.

7. An imaging member in accordance with claim 5 wherein aryl contains from 6 to about 24 carbon atoms.

8. An imaging member in accordance with claim 1 wherein the polyphosphazene is of the formula

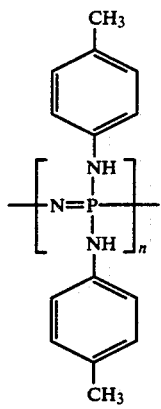

wherein n represents the number of repeating segments.

9. A photoconductive imaging member in accordance with claim 1 wherein the polyphosphazene is poly[bis(p-tolylamino)phosphazene, poly[bis(2-naphthoxy)]phosphazene, poly[bis(aryloxy)]phosphazene, poly[bis(methoxy)]phosphazene, poly[bis(ethoxy)]phosphazene, poly[bis(propyloxy)]phosphazene, poly[bis(trifluoroethoxy)]phosphazene, poly[bis(p-tolyloxy)]phosphazene, poly[bis(phenoxy)]phosphazene, poly[bis(p-bromophenoxy)]phosphazene, poly[bis(p-chlorophenoxy)]phosphazene, poly[bis(arylamino)]phosphazene, poly[bis(alkylamino)]phosphazene, poly[bis(methylamino)]phosphazene, poly[bis(ethylamino)]phosphazene, poly[bis(p-tolylamino)]phosphazene, poly[bis(p-anilino)]phosphazene, poly[bis(2-naphthylamino)]phosphazene, poly[bis(p-xylylamino)]phosphazene, poly[bis(dialkylamino)]phosphazene, poly[bis(diarylamino)]phosphazene, poly[bis(dimethylamino)]phosphazene, poly[bis(diethylamino)]phosphazene, poly[bis(dipropylamino)]phosphazene, poly[bis(dibutylamino)]phosphazene, poly[bis(p-ditolylamino)]phosphazene, poly[bis(carbazolyl)]phosphazene, poly[bis(dialkyl)]phosphazene, poly[bis(diaryl)]phosphazene, poly[bis(dimethyl)]phosphazene, poly[bis(diethyl)]phosphazene, poly[bis(dibenzyl)]phosphazene, poly[bis(ditoyl)]phosphazene, or poly[bis(dixylyl)]phosphazene.

10. A photoconductive imaging member in accordance with claim 1 wherein the polyphosphazene is soluble in toluene, xylene, tetrahydrofuran, or benzene.

11. A photoconductive imaging member in accordance with claim 1 containing a supporting substrate.

12. A photoconductive imaging member in accordance with claim 11 wherein the supporting substrate is comprised of a conductive component on an organic polymeric composition.

13. A photoconductive imaging member in accordance with claim 1 wherein the photogenerating layer is comprised of inorganic or organic photoconductive pigments.

14. A photoconductive imaging member in accordance with claim 13 wherein the photogenerating layer is comprised of selenium, selenium alloys, trigonal selenium, vanadyl phthalocyanine, squaraines, perylenes, metal free phthalocyanines, metal phthalocyanines, dibromoanthanthrone pigments, or mixtures thereof.

15. A photoconductive imaging member in accordance with claim 1 wherein the photogenerating layer is situated between a supporting substrate and the charge transport layer.

16. A photoconductive imaging member in accordance with claim 1 wherein the hole transport layer is situated between the photogenerating layer and a supporting substrate.

17. A photoconductive imaging member in accordance with claim 1 wherein the photogenerating layer is comprised of photogenerating pigments dispersed in a resinous binder in an amount of from about 5 percent by weight to about 95 percent by weight.

18. A photoconductive imaging member in accordance with claim 17 wherein the resinous binder is a polyester, polyvinyl butyral, a polycarbonate, or polyvinyl formal.

19. A photoconductive imaging member in accordance with claim 1 containing a charge blocking layer and an adhesive layer.

20. A photoconductive imaging member in accordance with claim 1 containing an organosilane charge blocking layer and an adhesive layer.

21. A method of imaging which comprises generating an electrostatic image on the imaging member of claim 1; subsequently transferring this image to a suitable substrate; and thereafter permanently affixing the image thereto.

22. A method of imaging which comprises generating an electrostatic image on the imaging member of claim 5; subsequently transferring this image to a suitable substrate; and thereafter permanently affixing the image thereto.

23. A process for the preparation of the imaging members of claim 1 wherein the hole transport layer is applied to the photogenerating layer from a solution coating of a nontoxic aromatic solvent and polyorganophosphazene.

24. A process in accordance with claim 23 wherein the solvent is xylene, toluene, benzene, or tetrahydrofuran.

25. A hole transport or electron transport layer comprised of charge transport molecules or electron transport molecules, respectively, dispersed in a polyorganophosphazene resinous binder.

26. A hole transport or electron transport layer in accordance with claim 25 wherein the polyphosphazene is of the formula

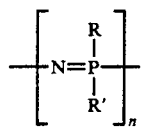

wherein R and R' are independently selected from the group consisting of alkyl, aryl, alkyl amino, aryl amino, alkoxy, and aryloxy; and n represents the number of repeating segments.

27. A photoconductive imaging member comprised of a supporting substrate, in contact therewith a photogenerating layer, and in contact with the photogenerating layer a hole transport layer containing a polyorganophosphazene resinous binder of the formula

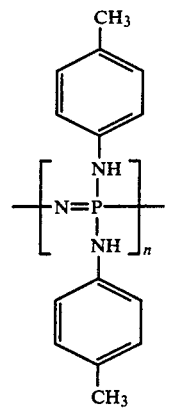

wherein n represents the number of repeating segments.

28. A photoconductive imaging member comprised of a supporting substrate, in contact therewith a photogenerating layer, and in contact with the photogenerating layer a hole transport layer containing a polyphosphazene resinous binder of the formula

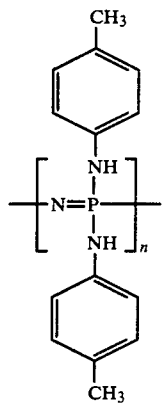

wherein n represents the number of repeating segments.

29. An imaging member in accordance with claim 5 wherein n is a number of from 1 to about 100.

30. An imaging member in accordance with claim 5 wherein n is a number of from 1 to about 25.

31. An imaging member in accordance with claim 8 wherein n is a number of from 1 to about 100.

32. An imaging member in accordance with claim 8 wherein n is a number of from 1 to about 25.

33. A photoconductive imaging member comprised of a photogenerating layer, and a hole transport layer comprised of hole transport components dispersed in a polyphosphazene resinous binder.

34. A photoconductive imaging member comprised of a supporting substrate, a photogenerating layer, and a hole transport layer comprised of hole transport components and a polyphosphazene resinous binder, which hole transport layer is applied to the photogenerating layer from a solution thereof containing a nontoxic solvent.

35. An imaging member in accordance with claim 34 wherein the solvent is an aromatic.

36. An imaging member in accordance with claim 34 wherein the solvent is selected from the group consisting of xylene, toluene, benzene, and tetrahydrofuran.

37. An imaging member in accordance with claim 1 wherein the polyphosphazenes are purified prior to their selection as a resinous binder.

38. A process in accordance with claim 23 wherein the polyphosphazenes are purified by accomplishing the dissolving thereof in a solvent followed by precipitation thereof.

* * * * *